(12) United States Patent
Naito

(10) Patent No.: US 6,710,909 B2
(45) Date of Patent: Mar. 23, 2004

(54) PROJECTOR

(75) Inventor: Keijiro Naito, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/290,231

(22) Filed: Nov. 8, 2002

(65) Prior Publication Data

US 2003/0086148 A1 May 8, 2003

(30) Foreign Application Priority Data

Nov. 8, 2001 (JP) .......................................... 2001-343491
Aug. 23, 2002 (JP) .......................................... 2002-243208

(51) Int. Cl.$^7$ ......................... G02B 26/00; G02B 26/08; G02B 27/10; G02B 27/14; G02F 1/01

(52) U.S. Cl. ..................... 359/291; 359/290; 359/295; 359/298; 359/238; 359/276; 359/622; 359/629; 359/618; 359/621

(58) Field of Search ................................. 359/290, 291, 359/295, 298, 237, 238, 276, 618, 621, 622, 625, 629, 631

(56) References Cited

U.S. PATENT DOCUMENTS 6,330,112 B1 * 12/2001 Kaise et al. ................. 359/621
6,567,217 B1 *  5/2003 Kowarz et al. .............. 359/618

* cited by examiner

*Primary Examiner*—Georgia Epps
*Assistant Examiner*—Jack Dinh
(74) *Attorney, Agent, or Firm*—Oliff & Berridge, PLC

(57) ABSTRACT

A projector has an illuminating optical system for irradiating white light, a color switching optical system for dividing the white light irradiated by the illuminating optical system into color lights in a time-division manner, a DMD™ for modulating the respective color lights in accordance with an image signal, a projection optical system for projecting the light beam modulated by the DMD, a light-composite optical system for getting the light beam not incident on the projection optical system to be incident again on the DMD and a device controller for controlling the operation of the projector, where the light beam irradiated by the DMD and not incident on the projection optical system is irradiated as a light beam of uniform illuminance distribution by the light-composite optical system and is again introduced on an illumination optical axis to be incident on the DMD, thus enhancing peak luminance of the projected image and achieving high contrast ratio.

6 Claims, 6 Drawing Sheets

PROJECTOR

BACKGROUND OF THE INVENTION

1. Field of Invention

The present invention relates to a projector for projecting and displaying an image. More specifically, it relates to a projector using a DMD™.

2. Description of Related Art

A projector which modulates a light beam irradiated by a light source using an electric optical device and projects the modulated light beam onto a screen in an enlarged manner using a projection lens has been known.

As an optical modulator constituting the electric optical device, DMD (digital Micro-mirror Device: registered Trademark of Texas Instruments Incorporated, hereinafter referred to as DMD) as a reflective optical modulator for modulating a light beam irradiated by a light source in accordance with image information by controlling incident angle of micro-mirrors is known.

The DMD modulates a light beam from a light source in accordance with image data and irradiates modulated light as an image light representing an image, of which two-dimensionally arrayed pixels are constructed of minute mirrors, the inclination of the mirrors being controlled by a function of electrostatic field of memory element disposed directly below each pixel, so that the reflection angle of the reflected light is changed to set on/off condition and the light reflected in a predetermined direction is incident on a projection lens to be projected as an image light.

When the pixel is in off condition, the light beam reflected by DMD is not incident on the projection lens and is not projected as an image signal, which is introduced to a predetermined location in the electric optical device.

According to such arrangement, the light beam from the light source can be deflected by switching on and off conditions, thereby conducting optical switching with superior S/N ratio.

However, according to the above arrangement, the light beam reflected by the DMD when the pixel is off, i.e. the light beam not introduced to the projection lens, is introduced to a predetermined location in the device, which is disposed of as redundant light among all the light beam irradiated by the light source. The existence of redundant light greatly reduces the total light amount of the image projected through the projection lens relative to the total light amount directly irradiated by the light source, thereby reducing peak luminance of the displayed image.

Further, when the pixel is off, since the light reflected by DMD is not incident on the projection lens as an image light and is introduced to a predetermined location in the device, the introduced light is reflected inside the device and is taken into the projection lens as a stray light, so that the contrast ratio of the image projected on the screen is lowered.

SUMMARY OF THE INVENTION

An object of the present invention is to provide a projector capable of improving peak luminance of image light and achieving high contrast ratio.

A projector according to an aspect of the present invention has: a light source; a reflective optical modulator that modulates a light beam irradiated by the light source in accordance with image information by controlling an incident angle of a micro-mirror, the modulated light beam being enlarged and projected by a projection optical system; and a light-composite path that combines the light beam modulated by the reflective optical modulator and not incident on the projection optical system with the light beam irradiated by the light source, the combined light beam being introduced again onto the reflective optical modulator.

According to the above aspect of the present invention, since the light-composite path for getting the light beam irradiated by the reflective optical modulator and not incident on the projection optical system to be again incident on the reflective optical modulator is provided, the light beam not incident on the projection optical system, i.e. the redundant light, can be supplied on the reflective optical modulator by the light-composite path, so that, when white area is displayed on non-display (black display) area of a projection image for instance, the luminance of the white area can be enhanced and contrast between white and black areas can be increased.

Further, since total light amount incident on the micro-mirror can be increased even when the size of the micro-mirror of the optical modulator is reduced, i.e. when the size of the picture element is reduced sufficient peak luminance and high contrast ratio can be attained.

Since the total light amount incident on the micro-mirror can be increased, the light amount of the projection image can be increased. Accordingly, the distance between the projection screen and the projection optical system can be sufficiently widened and an image of sufficiently high contrast ratio can be viewed even when the projection image is enlarged to correspond to large-screen.

Further, since the light-composite path is provided, the light beam irradiated by the optical modulator and not incident on the projection optical system can be prevented from being reflected on the components in the device to be taken into the projection optical system when the light beam is introduced to a predetermined location in the device, the deterioration of the contrast ratio of the projection image on account of stray light can be prevented and stable projection image can be maintained.

In the present invention, a second optical modulator may preferably be provided in the light-composite path, the second optical modulator switching introduction and block of the flow of the light beam not incident on the projection optical system toward the reflective optical modulator in synchronization with the image information.

The second optical modulator may be liquid crystal shutter and a reflective optical element capable of adjusting attitude thereof in the light-composite path.

When the projection image is set to non-displayed (black display) condition, the light beam irradiated by the light source enters into the light-composite path via the reflective optical modulator and the light passing through the light-composite path is again incident on the reflective modulator. By repeating such cycles, the light amount of the light beam incident on the reflective optical modulator increases and the light amount of the non-display image can be increased.

Since the second optical modulator is provided in the light-composite path, the light beam incident on the reflective optical modulator can be blocked by the second optical modulator, thus preventing increase in the light amount of the non-display image.

In the present invention, an optical integrator that equalizes the illuminance distribution of the light beam not incident on the projection optical system before introducing on the reflective optical modulator may preferably be provided in the light-composite path.

The beam splitter used for the optical integrator may be a multi-lens array using avertically and horizontally aligned lenses and a rod integrator using multiple reflections by inside total-reflection.

When the light beam irradiated by the light source is reflected by the reflective optical modulator, the image light incident on the projection optical system to be irradiated as an image and the light beam entering into the light-composite path are reversed. When the light beam passes through the light-composite path and is incident again on the reflective optical modulator, the light amount of the image light does not increase if the light beam is reversed relative to the image light.

Since the optical integrator having the beam splitter for splitting the light beam into a plurality of sub-beams is provided in the light-composite path, the light beam reversed relative to the image light is irradiated as a light beam having uniform illuminance distribution after being split into the sub-beams and superposed, so that the total light amount of the image light increases and high contrast ratio can be attained by irradiating the light beam again onto the reflective optical modulator.

In the present invention, the image information may preferably be transmitted to the reflective optical modulator by inputting an image signal corresponding to a color light to be modulated in a time-division manner, and a filter switch that switches color filters in synchronization with the image signal inputted to the reflective optical modulator may preferably be provided between the light source and the reflective optical modulator.

According to the above arrangement, by switching the light beam from the light source into red, green and blue light in synchronization with the image signal inputted to the reflective optical modulator using the color filter in a time-division manner, color projection image can be obtained with one reflective optical modulator.

DETAILED DESCRIPTION OF PREFERRED EMBODIMENT(S)

Figure 1:
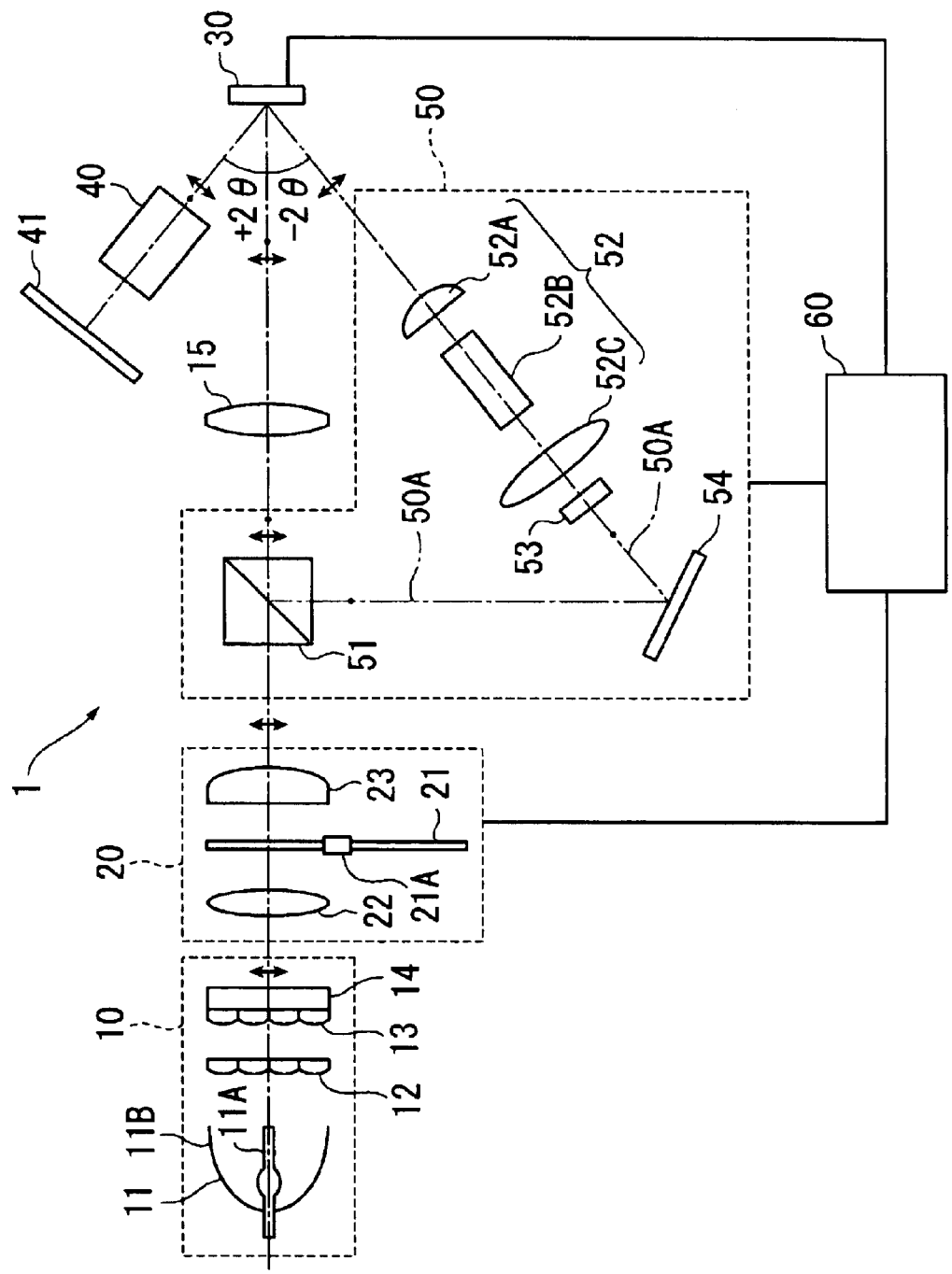
FIG. 1 is a schematic illustration showing a structure of a projector according to first embodiment of the present invention.

Preferred embodiments of the present invention will be described below with reference to the attached drawings.
[First Embodiment]
[1] Structure of Projector
FIG. 1 is an illustration schematically showing a structure of a projector according to first embodiment. A projector 1 has an illuminating optical system 10 for irradiating white light, a color switching ptical system 20 for switching the white color irradiated by the illuminating optical system 10 to color lights of red, green and blue on a time-division basis, a DMD 30 for modulating the respective color lights in accordance with image signal, a projection optical system 40 for projecting the light beam modulated by the DMD 30, a light-composite optical system 50 for irradiating the light beam not irradiated on the projection optical system 40 again onto the DMD 30, and a device controller 60 for controlling the operation of the projector 1.

The illuminating optical system 10 is an optical system for substantially uniformly illuminating the image formation area of the DMD 30, which includes a light source 11, a first lens array 12, a second lens array 13 including a UV filter, and a polarization converter 14.

The light source 11 has a light source lamp 11A as a radiation light source for irradiating radial light beam, and a reflector for reflecting the radial light irradiated by the light source lamp 11A. Halogen lamp, metal halide lamp and high-pressure mercury lamp are often used as the light source lamp 11A. A parabolic mirror is used as the reflector 11B. Instead of the parabolic mirror, an ellipsoid mirror may be used together with parallelizing lens (concave lens).

The first lens array 12 has a matrix of small lenses having rectangular profile viewed in illumination optical axis direction, The respective small lenses splits the light beam irradiated by the light source lamp 11A into a plurality of sub-beams. The profile of the respective small lenses is arranged approximately similar to the image formation area of the liquid DMD 30. For instance, when the aspect ratio (ratio of horizontal and vertical dimension) of the image formation area of the DMD 30 is 4:3, then the aspect ratio of each of the small lens is set as 4:3.

The arrangement of the second lens array 13 is substantially identical with the first lens array 12, in which small lenses are arrayed in matrix. The second lens array 13 together with a superposition lens 15 disposed on illumination optical axis focuses the image of the respective small lenses of the first lens array 12 on the DMD 30.

The polarization converter 14 is located on the downstream side of the second lens array 13, which is integrated with the second lens array 13 as a unit. The polarization converter 14 converts the light from the second lens array 13 to one polarization light (P polarization light). The respective sub-beams converted into single polarization light (P polarization light) by the polarization converter 14 are substantially superposed on the DMD) 30 by the superposition lens 15. Incidentally, such polarization converter 14 is disclosed in, for instance, Japanese Patent Laid-Open Publication No. Hei 8-304739.

The color-switching optical system 20 is formed in a disc, which includes a color wheel 21 for switching the light beam irradiated by the illuminating optical system 10 into three color lights of red, green and blue by the rotation thereof, a first condenser lens 22 for condensing the light beam irradiated by the illuminating optical system 10 around the color wheel 21, and a second condenser lens 23 for turning a divergent light passing through the color wheel 21 into approximately parallel light.

Figure 2:
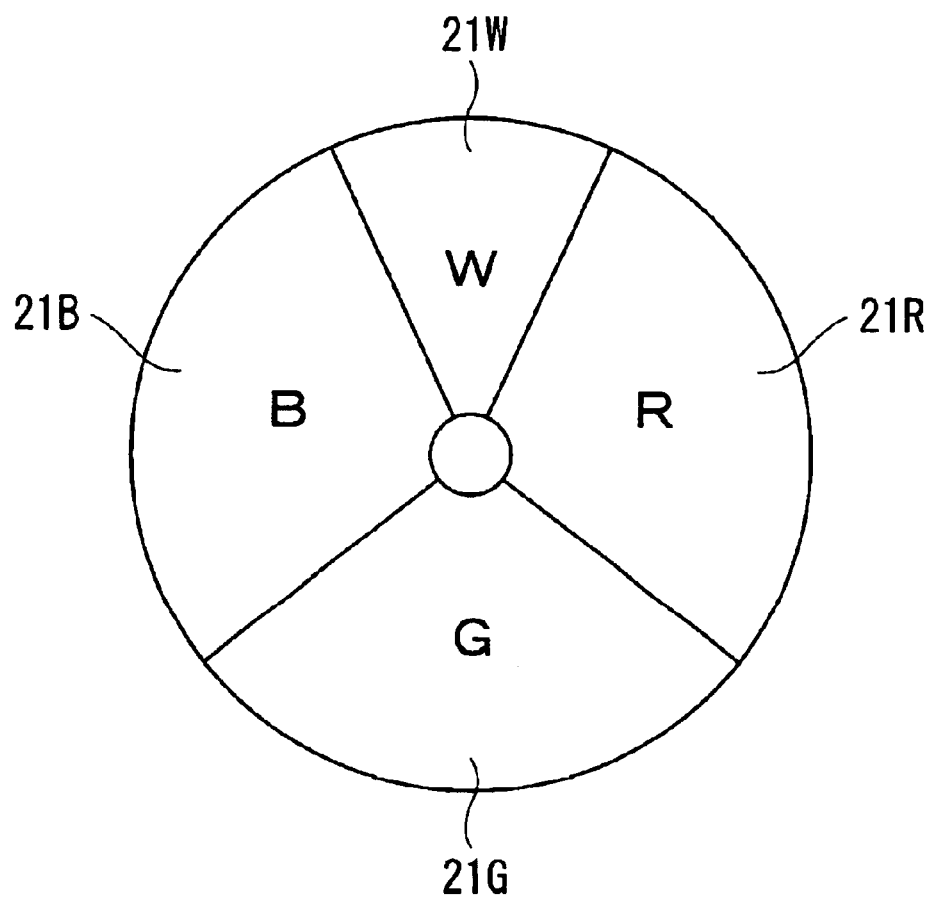
FIG. 2 is a front elevational view showing a structure of a color wheel of the aforesaid embodiment.

On the color wheel 21, as shown in FIG. 2 (front elevational view of the color wheel 21), three transmission color filters 21R, 21G and 21B are formed on four sector areas divided in rotary direction. The transmission color filter 21R transmits only red light by transmitting the light of wavelength of red and reflecting or absorbing the light of the other wavelength range. Similarly, the transmission color filters 21G and 21B transmit only green and blue color lights by transmitting the light of wavelength of green and blue respectively and reflecting or absorbing the light of the other wavelength range. Such transmission color filters 21R, 21G and 21B may be, for instance, a filter plate formed by dielectric multi-layered film and coating. The sector area other than the transmission color filters 21R, 21G and 21B is a light-transmission area 21W, which directly passes the light beam irradiated by the illuminating optical system 10. The light-transmission area 21W increases the luminance of the projected image to secure brightness of the projected image.

The DMD 30 is a reflective optical modulator integrating a multiple of movable micro-mirrors on a semiconductor chip using micro-machine technique based on CMOS wafer process, the movable micro-mirrors being rotated around diagonal axis to be bistable inclined in two predetermined angles (±θ). A great light deflection angle of 4θ can be obtained between the two bistable conditions, thus conducting optical switching with excellent S/N ratio. Among the light beaux incident on the DMD) 30, the light beam deflected in +2θ direction is projected as the image light by the projection optical system and the light beam deflected in −2θ direction enters in the light-composite optical system 50 for irradiating the light again on the DMD 30.

Figure 3:
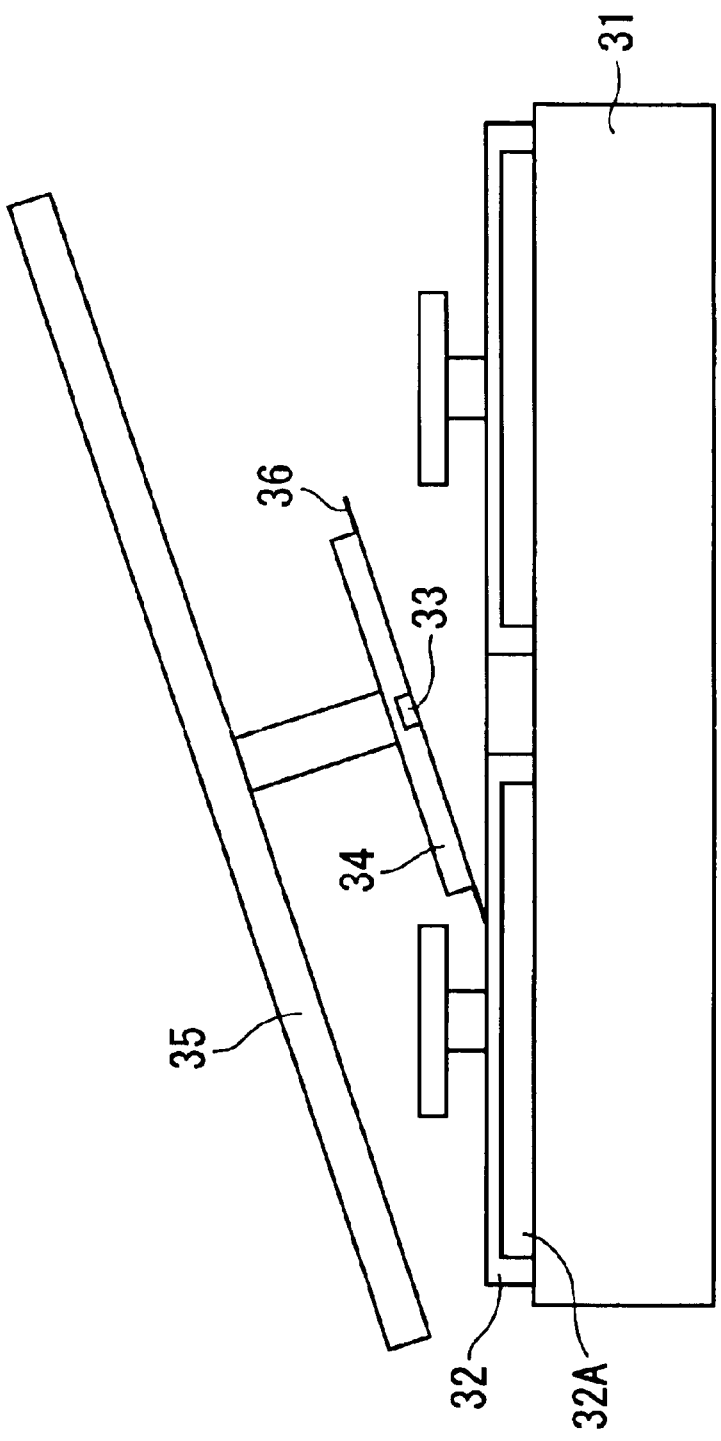
FIG. 3 is a side elevational view showing a structure of DMD of the aforesaid embodiment.

Specifically, the DMD 30 is formed by a minute processing using semiconductor process technique, where an address electrode/bias bus layer 32, a hinge layer 33, a yoke layer 34 and a minor layer 35 are sequentially formed by sputtering on a COMS board 31 as shown in FIG. 3. Organic polymer etc. is filled between the address electrode 32A and the hinge layer 33/the yoke layer 34, and between the hinge layer 33/yoke layer 34 and the mirror layer 35, the organic polymer being removed by plasma etching etc. after forming the films, so that the mirror layer 35 and yoke layer 34 are set free to be rotatable.

The address electrode 32A is electrically connected with the CMOS board 31 on the lower side thereof. When a predetermined bias voltage is applied on the address electrode 32A, electrostatic attraction works between the mirror layer 35 and the address electrode 32A and between the yoke layer 34 and the address electrode 32A, thereby efficiently generating electrostatic torque, thereby rotating the mirror layer 35 and the yoke layer 34 against the restoring force of the hinge layer 33. The mirror layer 35 and the yoke layer 34 are rotated until a spring chip 36 is landed. When the bias voltage applied to the address electrode 32A is zero, the mirror layer 35 is horizontally stable on account of restoring force of the hinge layer 33. In the present arrangement, two conditions of leftward inclination shown in FIG. 3 (+θ) and rightward inclination (not shown: −θ) are used to obtain great light deflection of 4θ.

The projection optical system 40 projects the image light modulated by the DMD 30 on a screen 41 in an enlarged manner, which is constructed as a lens set having a plurality of condenser elements (not shown) along optical axis in order to avoid blurring the projected image on account of chromatic aberration of the respective color lights of red, green and blue.

The light-composite optical system 50 is for getting the light beam modulated by the DMD 30 and not incident on the projection optical system 40 to be incident again onto the DMD 30. The light beam is guided on a light-composite path 50A to be a light beam of uniform illuminance distribution, which is finally superposed on the DMD 30 by the superposition lens 15 disposed on the illumination optical axis.

The device controller 60 is electrically connected with the color switching optical system 20, the light-composite optical system 50 and the DMD 30 to control the operation of the respective components.

[2] Structure of Light-Composite Optical System

The light-composite optical system 50 is for letting the light beam modulated by the DMD 30 and not incident on the projection optical system 40 to be incident again onto the, DMD 30, the light beam being incident on the DMD 30 by being introduced on the light-composite path 50A.

An optical integrator 52 for equalizing the illuminance distribution of the light beam entering into the light-composite path 50A, a liquid crystal shutter 53 as a second optical modulator for switching introduction and block of the flow of the light beam equalized by the optical integrator 52 toward the DMD 30, a mirror 54 for introducing the light beam passing through the liquid crystal shutter 53 onto the illumination optical axis, and a polarization beam splitter 51 for transmitting the P polarization light and reflecting S polarization light.

The optical integrator 52 has a third condenser lens 52A for condensing the light entering into the light-composite path 50A through the DMD 30, a transmission rod 52B for equalizing illuminance distribution of the light beam condensed by the third condenser lens 52A and a fourth condenser lens 52C for condensing the light beam irradiated by the transmission rod 52B on the liquid crystal shutter 53.

The transmission rod 52B is a pillar of approximately rectangular cross section, the shape of the cross section thereof being formed in the same aspect ratio as the DMD 30, which totally reflects the light beam entering from the light-incident side with the side surface thereof so that the light beam of uniform illuminance distribution is irradiated from the irradiating side thereof, where the light beam entering into the light-composite path 50A via the DMD 30, i.e. the light beam reversing the image light entering into the projection optical system 40 (light beam of unequal illuminance distribution) is reflected in multiple times inside the transmission rod 52B to equalize the illuminance distribution.

The liquid crystal shutter 53 converts the orientation of the liquid crystal thereof by applying voltage to transmit and shut the linear polarization light beam incident thereon, where two polarizing plates having mutually orthogonal polarization directions sandwich the liquid crystal layer.

According to the above arrangement, when the incident light beam transmits through the liquid crystal shutter 53, the incident linear polarization light beam is transmitted with the polarization angle thereof is rotated by ninety degrees. In other words, the incident P polarization light is irradiated as S polarization light when transmitting through the liquid crystal shutter 53.

The polarization beam splitter 51 is disposed on the illumination optical axis, which transmits the light beam irradiated from the illuminating optical system and converted into P polarization light by the polarization converter 14 and reflects the light beam irradiated by the liquid crystal shutter 53 as S polarization light and incident on the polarization beam splitter 51 through the mirror 54, thus combining and emitting the two light beams on the illumination optical axis.

[3] Control Structure of Projector

Figure 4:
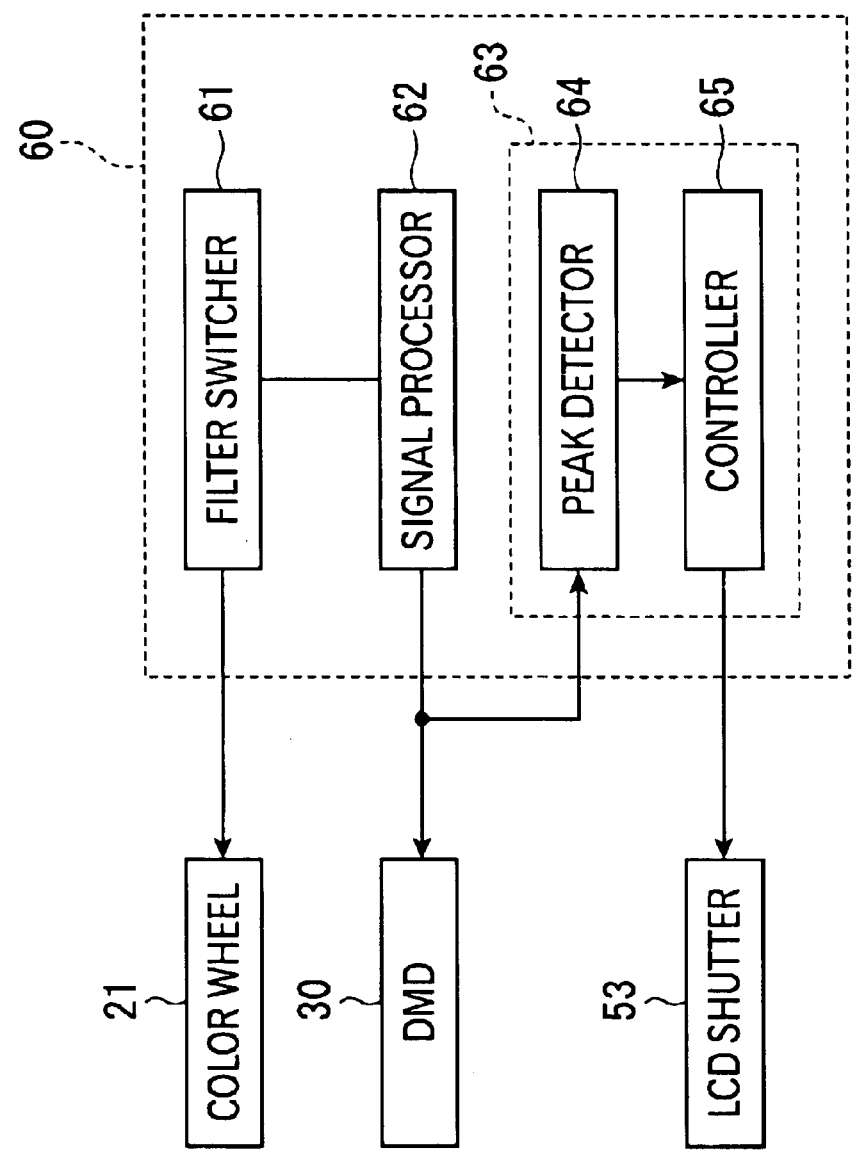
FIG. 4 is a block diagram showing a control structure of a projector according to the aforesaid embodiment.

FIG. 4 schematically shows a control structure of the projector 1 of the first embodiment.

The device controller 60 has a filter switcher 61 for driving the color wheel 21, a signal processor 62 for sending image signal to the DMD 30 to change on/off of the movable micro-mirrors, and a liquid crystal shutter controller 63 for applying voltage to the liquid crystal shutter 53 based on the image signal outputted by the signal processor 62.

The filter switcher 61 rotates the color wheel around a rotation axis 21A at a predetermined frequency of 240 Hz.

The light beam irradiated by the light source lamp 1A is sequentially irradiated on the transmission color filters 21R, 21G and 21B and the light-transmission area 21W formed on the color wheel 21 in accordance with the rotation of the color wheel 21, which, as a result, is changed into red light, green light, blue light and white light in a predetermined cycle to be irradiated after passing through the color wheel 21.

The signal processor 62 outputs an image signal to the DMD 30 in synchronization with the predetermined frequency of the filter switcher 61 to turn on/off the movable micro-mirrors corresponding to the respective picture elements of red, green and blue.

The liquid crystal shutter controller 63 controls the liquid crystal shutter 53 in synchronization with the signal processor 62, which includes a peak detector 64 for arithmetic processing based on the image signal outputted by the signal processor 62, and a controller 65 for controlling the liquid crystal shutter 53 based on the output signal from the peak detector 64.

The peak detector 64 arithmetically detects display area of red image, green image, blue image and white image and non-display (black image) area on which none of red, green, blue and white images are displayed based on the image signal outputted by the signal processor 62. The peak detector 64 outputs two signal indicating that the display area exists or that there is no display area on the whole image area (i.e. there is only non-display area) to the controller 65.

The controller 65 controls the liquid crystal shutter 53 based on the output signal from the peak detector 64, which applies voltage to the liquid crystal shutter 53 when there is no calculated display area on the whole image area, so that the incident light beam can not be transmitted through (i.e. blocked by) the liquid crystal shutter 53. On the other hand, when there is display area in the whole image area, voltage is not applied to the liquid crystal shutter 53, so that the incident light beam is irradiated with polarization angle thereof being rotated by ninety degrees after passing through the liquid crystal shutter 53.

[4] Advantages of First Embodiment

According to the above-described first embodiment, following advantages can be obtained.

(1) Since the light-composite optical system 50 for getting the light beam irradiated by the DMD 30 and not incident on the projection optical system to be incident again on the DMD 30 is provided, the light beam not incident on the projection optical system 40, i.e. the redundant light can be supplied again on the DMD 30 by the light-composite optical system 50, so that the luminance of the display area can be enhanced when the display area and non-display area are mixed on the projection image, thereby improving the contrast ratio.

(2) Since the total light incident on the movable micro-mirror can be increased even when the size of the movable micro-mirror is reduced in response to the demand for high-definition, i.e. reduction in the size of picture element, sufficient peak luminance can be obtained to achieve high contrast ratio.

(3) Since the total light incident on the movable micro-mirror of the DMD 30 can be increased, the light amount of the projection image can be increased, Accordingly, the distance between the screen 41 onto which the image is projected and the projector 1 can be sufficiently widened, so that an image of sufficient contrast ratio can be viewed even when the projection image is enlarged for display on a large screen.

(4) Since the light-composite optical system 50 is provided, the light bean irradiated by the DMD 30 and not incident on the projection optical system 40 can be prevented from being reflected on a member inside the projector 1 to be taken in the projection optical system 40, so that deterioration of contrast ratio of the projection image on account of stray light can be prevented and stable projection image can be maintained.

(5) Since the light-composite optical system 50 is provided with the optical integrator 52, illuminance distribution of the light beam irradiated by the DMD 30 and not incident on the projection optical system 40 can be equalized, so that uniform light beam can be irradiated to be incident on the DMD 30. Accordingly, the light beam of uniform illuminance distribution can be incident on the DMD 30 without getting a light beam reversed relative to the image light to be incident again on the DMD 30, so that the light amount of the image light can be increased and high contrast ratio can be achieved.

(6) Since the optical integrator 52 condenses the light beam reflected by the DMD 30 and entered to the light-composite path 50A in a divergent manner and gets the light beam to be incident again on the DMD 30 through the mirror 54 and the polarization beam splitter 51, there is no need for enlarging the size of the mirror 54 and the polarization beam splitter 51, thus reducing the size of the respective components.

(7) Since the liquid crystal shutter 53 is provided to the light-composite optical system 50, the light beam entering into the light-composite path 50A can be blocked when the whole image area is non-display area, thereby preventing increase in the light amount of the non-display area caused when the light beam advancing in the light-composite path 50A is incident on the DMD 30 for a multiple of times.

(8) Since the light beam can be blocked by the liquid crystal panel 53, redundant light can be blocked when the whole image area is non-display area, thereby preventing the light absorption of the DMD 30 from heat generation and physical deformation such as thermal distortion.

(9) Since the polarization beam splitter 51 is provided to the light-composite optical system 50, the polarization beam splitter 51 can transmit the light beam Irradiated from the light source lamp 11A and converted into P polarization light by the polarization converter 14 to be advanced on the illumination optical axis and can reflect the light beam deflected from the illumination optical axis to enter into the light-composite path 50A to be irradiated as S polarization light by the liquid crystal shutter 53 to be advanced again on the illumination optical axis, thus combining the two light beams and increasing the total light amount incident on the DMD 30.

(10) The filter switcher 61 can rotate the color wheel 21 in synchronization with the image signal inputted to the DMD) 30 to switch the light beam irradiated by the light source lamp 11A to red, green and blue in a time-division manner, thereby achieving color projection image with a single DMD 30.

(11) Since the liquid crystal shutter controller 63 has the peak detector 64 and the controller 65, the peak detector 64 can arithmetically detect the whole display area of the red image, green image, blue image and white image and the non-display area displaying neither one of the red image, green image, blue image and white image based on the image signal outputted by the signal processor 62. When there is no display area in the whole image area, a signal is sent to the controller 65 to apply voltage to the liquid crystal shutter 53 to shut the light beam incident on the liquid crystal shutter 53. Accordingly, since the operation of the liquid crystal shutter 53 is synchronized with the image signal outputted by the signal processor 62 for controlling the DMD 30, the transmission and block of the light beam can be switched by the liquid crystal shutter 53 in response to on/off of the movable micro-mirror of the DMD 30.

[Second Embodiment]

Next, a second embodiment of the present invention will be described below.

In the following description, the same structures and components as in the above-described first embodiment will be applied with the same reference number to omit or simplify detailed explanation thereof.

In the projector 1 of the first embodiment, the light-composite optical system 50 has the optical integrator 52, the liquid crystal shutter 53, the mirror 54 and the polarization beam splitter 51. The liquid crystal shutter 53 is controlled by the liquid crystal shutter controller 63 based on the image signal outputted by the signal processor 62 to switch transmission and block of the light beam advancing in the light-composite path 50A.

On the other hand, in the projector 2 of the second embodiment, the light-composite optical system 70 has a mirror 73, a half-wave plate 74 and a light absorber 75 as well as a polarization beam splitter 71 and an optical integrator 72 identical with those described in the first embodiment. The inclination of the mirror 73 is controlled by a device controller 80 to switch deflection angle of the irradiated light beam through the mirror 73.

Figure 5:
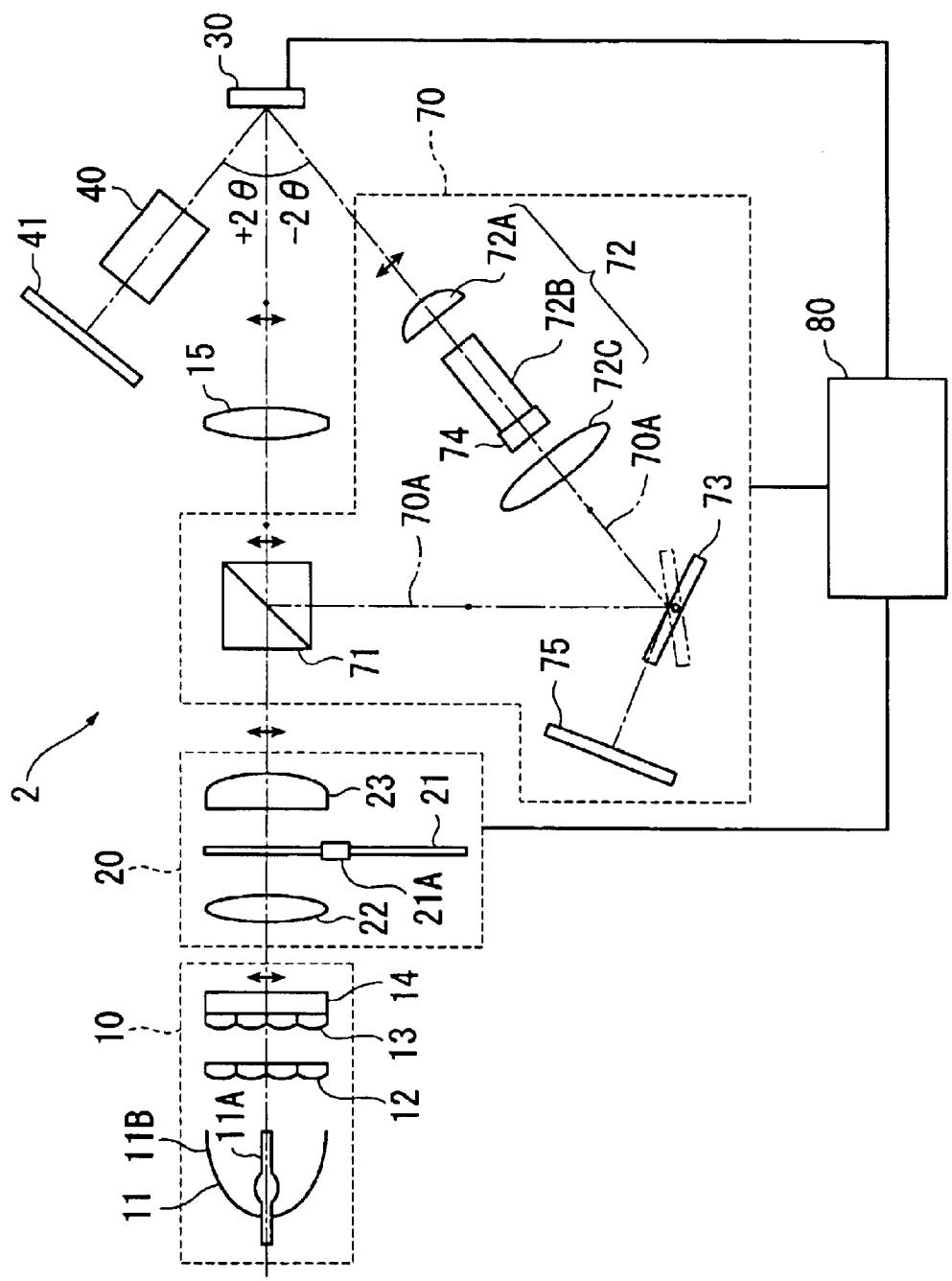
FIG. 5 is a schematic illustration showing a structure of a projector according to second embodiment of the present invention.

FIG. 5 schematically shows a structure of the projector according to second embodiment.

The mirror 73 is located on irradiation-side of the optical integrator 72 to be rotatable for changing inclination thereof. For instance, as shown in FIG. 5, the mirror 73 is rotatable around an axis orthogonal with the optical path surface formed by the light-composite path 70A. The attitude of the mirror 73 is switchably changed between an inclined condition to deflect light beam irradiated by the optical integrator 72 in the direction of the polarization beam splitter 71 and another inclined condition to deflect the light beam irradiated by the optical integrator 72 in the direction of the light absorber 75 in accordance with the command of the device controller 80.

The half-wave plate 74 is disposed on the irradiation side of the transmission rod 72B constituting the optical integrator 72. The light beam incident on the optical integrator 72 passes through the half wave plate 74 to be irradiated with the phase thereof being shifted by p.

The light absorber 75 absorbs the light beam deflected by the mirror 73. For instance, the surface of the light absorber 75 is textured and multi-layered anti-reflection film is further coated thereon. The reflection of incident light beam can be prevented by the surface on account of microscopic shape function and interference thereof.

Figure 6:
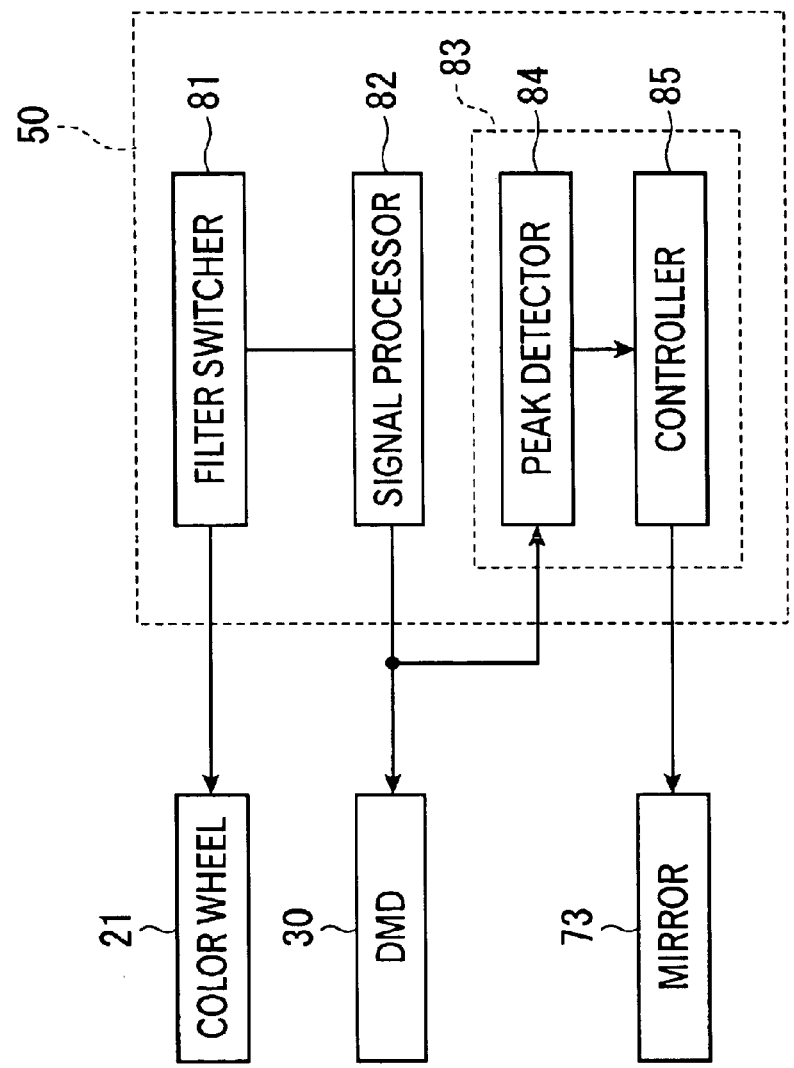
FIG. 6 is a block diagram showing a control structure of the projector according to the second embodiment.

FIG. 6 is a block diagram showing a control structure of the projector according to second embodiment.

The device controller 80 has a mirror controller 83 as well as a filter switcher 81 and a signal processor 82 identical with those described in the first embodiment.

The mirror controller 83 controls the inclination of the mirror 73 based on the image signal outputted by the signal processor 82. The mirror controller 83 has a controller 85 as well as a peak detector 85 identical with the peak detector described in the first embodiment.

The controller 85 recognizes the existence and non-existence of the display area detected by the peak detector 84, based on which the controller 85 changes the inclination of the mirror 73.

According to the above arrangement, the light beam irradiated by the illuminating optical system 10 passes through the polarization beam splitter 71 to be incident on the DMD 30. The light beam irradiated by the DMD 30 and not incident on the projection optical system 40 is incident on the light-composite optical system 70 and is irradiated on the minor 73 as a light beam of uniform illuminance distribution through the optical integrator 72. The P polarization light incident on the optical integrator 72 passes through the half wave plate 74 to be irradiated as S polarization light with the phase thereof being shifted by p.

As a result of calculation in the peak detector 84, when there is display area in the whole image area, the controller 85 changes the inclination of the mirror 73 so that the S polarization light passing through the optical integrator 72 to be deflected toward the polarization beam splitter 71. Thereafter, the S polarization light is again incident on the DMD 30 through the polarization beam splitter 71.

On the other hand, when it is detected that the whole image area is non-display area as a result of the peak detector 84, the controller 85 changes the inclination of the mirror 73 so that the S polarization light passing through the optical integrator 72 is deflected toward the light absorber 75 as shown in FIG. 5. Thereafter, the S polarization light is incident on the light absorber 75 and is absorbed by the light absorber 75 to be converted into heat.

According to the above second embodiment, following advantages as well as the above advantages (1) to (6) can be obtained.

(12) Since the light-composite optical system 70 has the attitude-controllable mirror 73 and the light absorber 75, when the whole image area is non-display area, the mirror 73 can be inclined at a predetermined angle so that the light beam entering into the light-composite path 70A and be incident on the light absorber 75, thus preventing increase in the light amount of the non-display image caused when the light beam advancing in the light composite path 70A is incident on the DMD 30 for a multiple of times.

(13) Since the light beam can be prevented from being incident on the DMD 30 for a multiple of times when the whole image area is non-display area, heat generation and physical deformation such as thermal distortion caused by light absorption of the DMD 30 can be prevented.

(14) Since the surface of the light absorber 75 is textured and coated with multi-layered anti-reflection film, the reflection of the light beam incident on the light absorber 75 can be prevented and the reflected light can be prevented from entering into the projection optical system 40, thus preventing deterioration of the contrast ratio of the projection image on account of stray light.

(15) Since the half wave plate 74 is provided on the irradiation side of the transmission rod 72B, when the light beam irradiated by the DMD 30 and not incident on the projection optical system 40 is irradiated as the light beam having uniform illuminance distribution by the transmission rod 721, the phase of the light beam is shifted by p and the P polarization light is irradiated as S polarization light. Accordingly, the S polarization light passing through the half wave plate 74 is reflected by the polarization beam splitter 71 and advances again to the illumination optical axis, which is combined with the P polarization light irradiated by the illuminating optical system 10 on the illumination optical axis, thus increasing the total light amount incident on the DMD) 30.

(16) Since the peak detector 84 and the controller 85 is provided on the mirror controller 83, the peak detector 84 arithmetically detects the display area of the red image, green image, blue image and white image and the non-display area displaying none of the red, green, blue and white images and, when there is no display area in the whole image area, the controller 83 sends a signal to the controller 85 to incline the mirror 73 in a predetermined angle, so that the incident light beam is introduced to the light absorber 75 to deflect the light beam away from the light-composite path 70A. Accordingly, since the control of the DMD 30 is synchronized with the image signal outputted by the signal processor 82, the inclination angle of the mirror 73 can be changed in response to on and off of the movable micro-mirror of the DMD 30, thus switching re-introduction and block of the light beam onto the DMD 30.

[Modifications]

Incidentally, the scope of the present invention is not restricted to the above-described embodiments, but includes other arrangement as long as an object of the present invention can be achieved, which includes following modifications.

Though single-plate projectors 1 and 2 using a single DMD) 30 are described in the above embodiments, the present invention can be applied to three-plate projector using three DMD respectively corresponding to red, green and blue. In this arrangement, three light-composite paths are required corresponding to the respective DMDs.

Though the optical integrators 52 and 72 including the transmission rods 52B and 72B are used in the light-composite optical systems 50 and 70, any arrangement is possible as long as the illuminance distribution of the light beam incident on the light-composite paths 50A and 70A can be equalized which include other optical integrators. For instance, an optical integrator similar to the first lens array 12 and the second lens array 13 constituting the illuminating optical system 10 of the above embodiments may be used.

Though two optical systems, i.e. the first lens array 12 and the second lens array 13 disposed on the illumination optical axis and the transmission rods 52B and 72B disposed in the light-composite paths 50A and 70A are used for equalizing the illuminance distribution, only one optical system may be used. Specifically, lens-array type optical system such as the first lens array and the second lens array may be disposed on the illumination optical axis between the polarization beam splitters 51 and 71 and the DMD 30, or, alternatively, an optical system such as transmission rod may be disposed.

Though the color switching optical system 20 is used for time-dividing the white light in the above embodiments, an LED light source etc. may be used, where the light beam from the light source is lit while switching colors thereof among red, green and blue and the image of corresponding color component is displayed on the DMD for achieving the color display.

What is claimed is:

1. A projector, comprising:
   a light source;
   a reflective optical modulator that modulates a light beam irradiated by the light source in accordance with image information by controlling an incident angle of a micro-mirror, the modulated light beam being enlarged and projected by a projection optical system; and
   a light-composite path that combines the light beam modulated by the reflective optical modulator incident other than on the projection optical system with the light beam irradiated by the light source, the combined light beam being introduced again onto the reflective optical modulator.

2. The projector according to claim 1, further comprising a second optical modulator disposed in the light-composite path, the second optical modulator switching introduction and block of the flow of the light beam incident other than on the projection optical system toward the reflective optical modulator in synchronization with the image information.

3. The projector according to claim 2, wherein the second optical modulator includes a liquid crystal shutter.

4. The projector according to claim 2, further comprising a reflective optical element disposed in the light-composite path that reflects and introduces the light beam incident other than on the projection optical system toward the reflective optical modulator, wherein the second optical modulator controls the attitude of the reflective optical element in the light-composite path.

5. The projector according to claim 1, further comprising an optical integrator disposed in the light-composite path that equalizes the illuminance distribution of the light beam incident other than on the projection optical system before introducing on the reflective optical modulator.

6. The projector according to claim 1, wherein the image information is transmitted to the reflective optical modulator by inputting an image signal corresponding to a color light to be modulated in a time-division manner, and
   wherein a filter switch that switches color filters in synchronization with the image signal inputted to the reflective optical modulator is provided between the light source and the reflective optical modulator.

* * * * *